United States Patent

[11] 3,633,869

[72] Inventor  Rolf-Konrad Lehmann
                Flensborg, Germany
[21] Appl. No. 64,124
[22] Filed     July 31, 1970
[45] Patented  Jan. 11, 1972
[73] Assignee  Danfoss A/S
                Nordborg, Denmark
                Continuation of application Ser. No.
                779,657, Nov. 27, 1968, which is a
                continuation of application Ser. No.
                481,751, Aug. 23, 1965. This application
                July 31, 1970, Ser. No. 64,124

[54] SOLENOID VALVE WITH ADJUSTABLE STROKE
     1 Claim, 1 Drawing Fig.
[52] U.S. Cl. ............................................. 251/129,
                                                        251/54
[51] Int. Cl. ............................................. F16k 31/06
[50] Field of Search ................................ 251/54,
                                              141, 129; 335/255

[56]              References Cited
            UNITED STATES PATENTS
1,640,324   8/1927   Hibbard ..................... 251/129 X
2,820,604   1/1958   Ray ........................... 251/129
2,294,421   9/1942   Ray ........................... 251/141
2,331,503   10/1943  Ray ........................... 251/129 X
2,859,298   11/1958  Burch......................... 335/255
2,923,521   2/1960   Ray ........................... 251/54
3,008,683   11/1961  Filliung et al. ............. 251/129 X
3,098,635   7/1963   Delaporte.................... 251/54
3,159,774   12/1964  Dube et al. ................. 251/54 X
3,218,022   11/1965  Lewis ......................... 251/141 X
2,859,298   11/1958  Burch......................... 335/255

Primary Examiner—Arnold Rosenthal
Attorney—Wayne B. Easton

ABSTRACT: A solenoid valve in which the solenoid having the valve element connected to the armature can be moved as a unit relative to the seat of the valve so that the stroke of the solenoid is varied without making any adjustment in the electrical characteristics of the solenoid. The valve element is connected to the armature by a bellows and the solenoid unit is mounted on the valve bonnet on a threaded portion so that it can be rotated on the thread so the unit as a whole is moved relative to the valve seat to vary the stroke of the solenoid armature without any other adjustment.

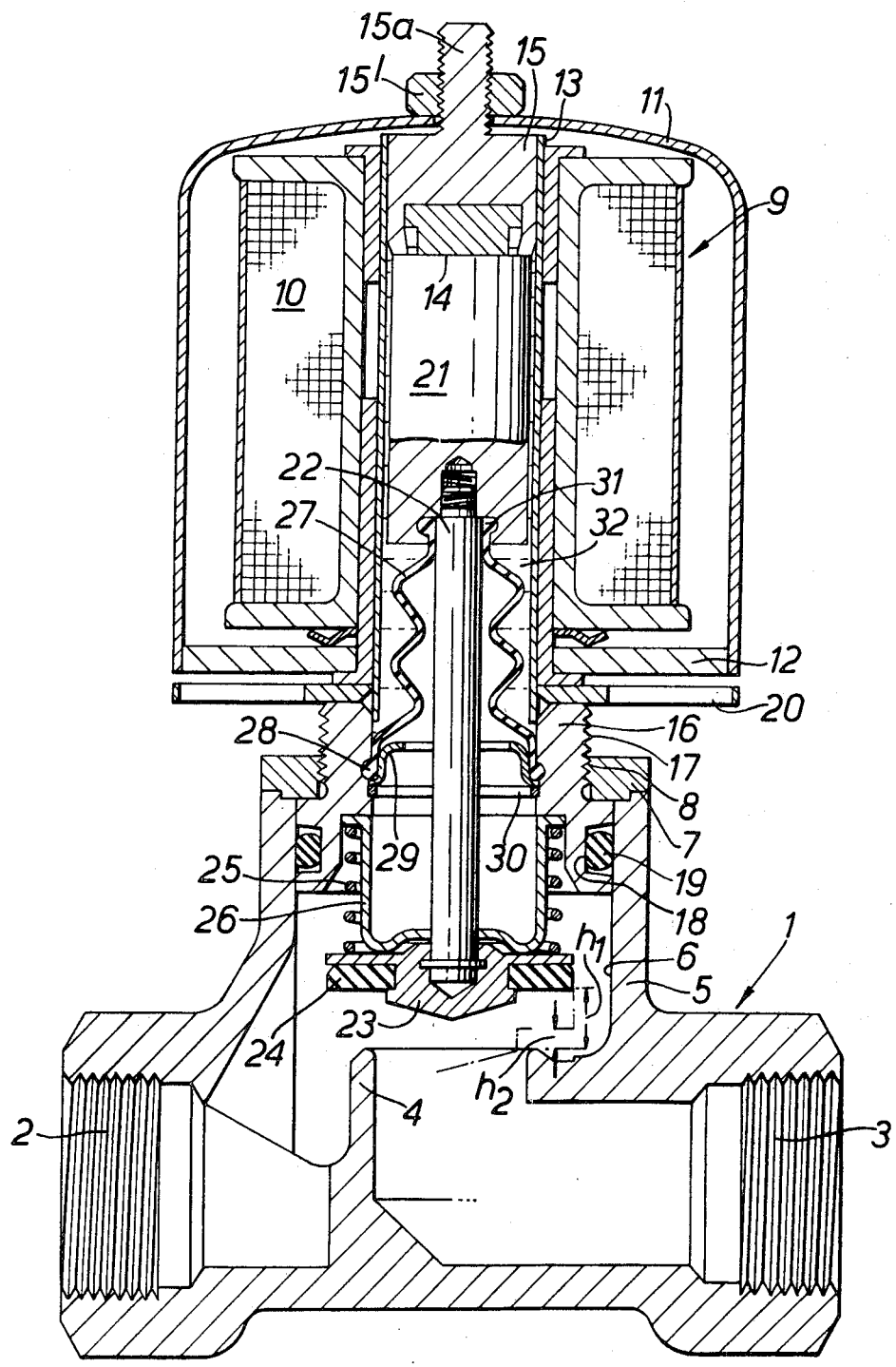

SOLENOID VALVE WITH ADJUSTABLE STROKE

This is a continuation of application Ser. No. 779,657, filed Nov. 27, 1968, which in turn is a continuation of application Ser. No. 481,751, filed Aug. 23, 1965.

This invention relates generally to valves and more particularly to a new and improved solenoid valve.

Solenoids are in general designed with a given plunger or armature stroke or throw of the solenoid valve. Solenoid valves generally have the seat defining one terminal position of the solenoid core or armature travel and the other terminal position is defined by the solenoid. However, at times it is desirable to be able to vary the stroke of the valve members of a valve in order to adjust it in accordance with operating conditions. This problem has heretofore been solved by setting the armature axially in relation to the valve elements. This requires that the solenoid be dismounted and adjusted. Another solution has been to use an adjustable stop in the solenoid such as a set screw extending externally from the solenoid axially and disposed coaxially therewith adjustably limiting the axial travel of the armature. The latter type constructions, however, do not permit a very accurate control of a valve of this type. The reason is that the electromagnetic characteristics of the solenoid itself are changed as the adjustable stop is moved axially, usually internally of the operating coil of the solenoid. These valves have an additional limitation in that if a fluid is to be contained in the solenoid valve for dampening, additional fluidtight seals must be constructed in the valve.

It is a principal object of the present invention to provide a solenoid valve construction in which the electromagnetic characteristics of the solenoid remain unvaried while axial travel of the whole solenoid assembly is variably adjusted, thereby to variably adjust the overall travel of a valve element in opening and closing the valve.

A feature of the solenoid valve according to the invention is the provision of a fixed stop defining a terminal position of the armature travel within the solenoid itself and a terminal stop defined as a fixed stop by the valve seat. Provision is made for a solenoid mount on the valve body constructed to permit positioning the solenoid armature axially, and a valve stem and valve element connected thereto, over a wide range of axial positions relative to the valve seat thereby to adjust the axial stroke of the solenoid armature and thus variably define a wide range of possible settings of travel of the valve element without changing the electromagnetic characteristics of the solenoid of the valve.

Another feature of the invention is the provision of a relatively large control thread on the adjustment members for axially positioning the solenoid, and therefore the solenoid armature, so that minor angular rotation of the solenoid assembly will make a substantial variation in the axial adjustment of the solenoid and therefore the opening control of the valve.

Still another feature of the invention is the elimination of the necessity of the complex sealing means employed where solenoid valves are mounted in a fixed position on a valve body. Provision is made in the solenoid valve according to the invention for sealing the solenoid mount and valve body in such a manner as to allow relative axial travel of the solenoid mount relative to the valve body while maintaining a positive seal. The seal is effected by use of a large O-ring disposed in an annular groove in either one of the two relatively movable parts bearing on an opposite face of one of the members thereby effecting a tight seal. The large diameter of the O-ring eliminates the necessity of having "tight" tolerances usually found in other types of sealing elements where axial adjustment is required of a small member so that the valve according to the invention can be mass produced easily and economically.

The arrangement of the valve and the use of a bellows seal connected to the valve stem internally of the solenoid and disposed to allow axial control of the valve stem to operate the valve element to a seated position independently of the solenoid electromagnetic operation permits the use of an internally fluid-filled solenoid effectively dampening the axial travel of the armature of the solenoid.

Other features and advantages of the solenoid valve in accordance with the present invention will be better understood as described in the following specification and appended claims in conjunction with the drawing illustrating in a vertical section view a valve according to the invention.

The valve in the drawing comprises a valve body 1 having an inlet 2 and an outlet 3 with a fixed seat 4. The valve is provided with a neck or bonnet 5 having an inner generally cylindrical surface 6 on an upper end of which is disposed a ring 7 having internal threads 8 and held radially in a recess on the upper end of the neck 5 as illustrated in the drawing.

The valve is provided with a solenoid 9 having an operating coil 10 disposed internally of a housing 11 to which is fixed a base 12. Internally of the housing 11 is disposed a tubular guide member 13 extending axially throughout the length of the housing 11. The guide tube is closed at an upper end by a surface 14 provided on an end closure member 15 which is maintained in a fixed position so that the surface 14 defines a terminal position or upper fixed terminal position of the axial travel of a solenoid armature as hereinafter explained. The member 15 is provided with an extension 15a of reduced diameter externally threaded and extending outwardly of the housing 11 and a nut 15' locks the member 15 in a preset and fixed position.

The solenoid housing is provided with a tubular extension 16 having an external thread 17 for cooperating with and complementary to the internal thread 8 of the ring 7. The extension extends axially downwardly into the neck 5 of the valve body and is provided with an outer annular recess 18 extending circumferentially of the lower part of the extension. The recess receives an O-ring which is compressed between the face or internal surface 6 of the valve body and the inner surface of the recess 18 providing a fluidtight seal between the solenoid and the valve body. The seal permits relative axial travel of the solenoid in the valve body neck to allow adjusting the solenoid valve as hereinafter described. The solenoid is provided with an adjustment or control member comprising a wheel or handle 20 fixed to the solenoid 9. The axial position of the extension 16 relative to the valve body may be controlled by angularly rotating the solenoid with the control wheel 20.

The solenoid armature comprises a core 21 having radial clearance between it and the guide tube 13. The armature is connected to a valve stem 22 on the lower part of which is connected a valve element 23 provided with a sealing ring 24 which seats on the seat 23 when the valve is operated to a closed position under control of a spring 25 when the solenoid 9 is not energized.

The entire solenoid assembly 9 including the valve element and the valve stem and related parts of the solenoid are movable axially of the neck 5 and relative to the seat 4 in dependence upon the angular position of the solenoid assembly as set by the wheel 20. The solenoid assembly comprises a cup member 26 provided with a central aperture at the base thereof through which the valve stem 22 extends axially and has an upper outwardly extending flange which extends at least partly circumferentially of the cup member and on which the spring 25 seats while the free end thereof bears on the valve element 23 biasing the valve element to a seated position closing the valve.

A bellows 27 is disposed coaxially with the guide tube 13 and extends axially therein. A lower end of the bellows is provided with a bead 28 received in a corresponding annular recess in the internal surface of the solenoid extension 16 and is held in a clamped and fluidtight position by an annular ring member 29 compressing the bead into the recess and held in axial position by a locking ring 30. The upper end of the bellows 27 is provided with a circumferential outwardly extending bead 31 received in a corresponding recess in the armature core 21 and a fluidtight seal is maintained between the core, the bellows and the valve stem 22 with the valve stem extending coaxially of the bellows and outwardly thereof as illustrated. The bellows has a lesser maximum diameter at any point thereof than the guide tube or sleeve 13 so that a compartment 32 is formed between the bellows and the guide tube which is in a fluidtight condition with the extension 16 and is closed at the upper end as before described. The compartment 32 is filled with a damping fluid that dampens the axial movement of the solenoid armature by restricting fluid flow in the clearance between the core 21 and the guide tube 13.

The operating coil 10 of the solenoid is electrically energized by an input through conductors, not shown, and will actuate the valve to a fully opened position, as illustrated in the drawing, in which the core 21 is stopped at the terminal upper position by the face 14. When the coil is deenergized the spring 25 seats the valve ring 24 on the seat 4 closing the valve as before described. In order to provide a wide range of settings of movement of the valve element between a closed and fully open position without having to change the upper terminal position of the armature in the solenoid as in the prior art, the present invention provides adjustment by moving the entire solenoid assembly axially as before described.

In the position illustrated in the drawing, the solenoid assembly is in its uppermost position and an annular shoulder on the extension 16 engages the underside of the ring 7 so that the height of travel of the valve element ring is illustrated as $h_1$. The solenoid 9 can then be positioned axially at any desired position intermediate the position illustrated in the drawing and some desired unseated position, for example as illustrated by the broken line adjacent the seat 4 which is configured to illustrate the valve element ring 24 in a position set by adjusting the wheel 20. In this lowered position, this axial position of the valve from a fully seated position to a fully opened position is illustrated as $h_2$.

It can thus be seen that by providing a scale on the wheel 20 and an index on the valve, any kind of desired setting of axial travel of the valve element from a fully closed position can be set over a very wide range without disturbing the electromagnetic characteristics of the solenoid. Thus, the valve can be adjusted through a very wide operating range depending on the operating conditions encountered.

While a preferred embodiment of the invention has been shown and described, it will be understood that many modifications and changes may be made within the true spirit and scope of the invention.

I claim:

1. An adjustable stroke solenoid valve assembly comprising first and second units, said first unit having a valve seat with fluid inlet and outlet ports on opposite sides of said valve seat, said inlet and outlet ports being in fixed relation to each other, said first unit defining a valve housing adjacent said valve seat, said second unit having a cylindrical surface forming a bore and a solenoid assembly which includes an armature, said armature being disposed in said bore, said second unit having a valve element connected to said armature, a bellows surrounding said valve element having one end fastened in sealing engagement to said valve element and the other end fastened in sealing engagement to said bore surface, thread means on said first and second units, said thread means being engageable to allow the attachment of said second unit to said first unit and to provide for the adjustable spacing of said second unit from said valve seat whereby the stroke of said valve element is also made adjustable.

* * * * *